United States Patent
Fechler et al.

(10) Patent No.: US 10,873,236 B2
(45) Date of Patent: Dec. 22, 2020

(54) MOTOR TRANSMISSION CONNECTION ARRANGEMENT, IN PARTICULAR FOR USE IN VEHICLES

(71) Applicants: Jens Fechler, Huefingen (DE); Marius Suess, Hondingen (DE); Wilfried Synovzik, Huefingen (DE)

(72) Inventors: Jens Fechler, Huefingen (DE); Marius Suess, Hondingen (DE); Wilfried Synovzik, Huefingen (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 0 days.

(21) Appl. No.: 15/987,709

(22) Filed: May 23, 2018

(65) Prior Publication Data

US 2018/0342924 A1    Nov. 29, 2018

(30) Foreign Application Priority Data

May 24, 2017    (EP) .................................. 17172633

(51) Int. Cl.
*H02K 5/14*    (2006.01)
*H02K 7/116*    (2006.01)
(Continued)

(52) U.S. Cl.
CPC ........... *H02K 5/145* (2013.01); *F16H 57/025* (2013.01); *H02K 5/14* (2013.01); *H02K 5/143* (2013.01);
(Continued)

(58) Field of Classification Search
CPC ........... H02K 5/145; H02K 5/14; H02K 5/15; H02K 7/1166; F16H 57/025
(Continued)

(56) References Cited

U.S. PATENT DOCUMENTS 6,288,464 B1    9/2001    Torii et al.
6,459,188 B1    10/2002    Lombardo et al.
(Continued)

FOREIGN PATENT DOCUMENTS

DE    10138749    3/2002
DE    102014212135    12/2015
(Continued)

OTHER PUBLICATIONS

Korean Intellectual Property Office, "Notice of Preliminary Rejection," Issued in Korean Patent Application No. 10-2018-0058594, document of 6 pages, plus English translation thereof, dated Feb. 7, 2019.
(Continued)

*Primary Examiner* — Terrance L Kenerly
(74) *Attorney, Agent, or Firm* — Akerman LLP; Peter A. Chiabotti

(57) ABSTRACT

A motor transmission connection arrangement, in particular for use in vehicles, can comprise a motor pot, a brush holder, and a transmission housing. The motor pot, the brush holder and the transmission housing are pluggable to connect with one another, and the motor pot can include a number of centering surfaces, whereby the motor pot with respectively one of the centering surfaces comes into contact both with the brush holder as well as with the transmission housing, when the motor pot, the brush holder and the transmission housing are plugged into one another. The brush holder and the transmission housing can be concentrically oriented to the motor pot. In addition, the present disclosure refers to a sunroof for a vehicle with a motor transmission connection arrangement of this type as well as a vehicle with such a motor transmission connection arrangement.

15 Claims, 3 Drawing Sheets

(51) Int. Cl.
*H02K 5/15* (2006.01)
*F16H 57/025* (2012.01)
*B60J 7/057* (2006.01)
*F16H 57/02* (2012.01)
*H01R 39/38* (2006.01)

(52) U.S. Cl.
CPC ............. *H02K 5/15* (2013.01); *H02K 7/1166* (2013.01); *B60J 7/0573* (2013.01); *F16H 2057/02034* (2013.01); *H01R 39/385* (2013.01)

(58) Field of Classification Search
USPC ........................................................ 310/239
See application file for complete search history.

(56) References Cited

U.S. PATENT DOCUMENTS

| | | |
|---|---|---|
| 7,898,142 B2 | 3/2011 | Uchimura |
| 8,823,228 B2 | 9/2014 | Mili |
| 2007/0120431 A1* | 5/2007 | Kokubu ................. H02K 5/148 310/75 R |
| 2016/0134073 A1* | 5/2016 | Tokizaki ................ H02K 5/145 310/71 |

FOREIGN PATENT DOCUMENTS

| | | |
|---|---|---|
| EP | 1101967 | 5/2001 |
| JP | H1175343 | 3/1999 |
| JP | 2009011077 | 1/2009 |
| JP | 2015016805 | 1/2015 |
| KR | 20110040813 | 4/2011 |

OTHER PUBLICATIONS

European Patent Office, "European Search Report," issued in European Patent Application No. 17 172 633.4, document of 7 pages, dated Jul. 10, 2017.

European Patent Office, "Office Action," issued in European Patent Application No. 17 172 633.4, document of 6 pages, dated Aug. 21, 2020.

* cited by examiner

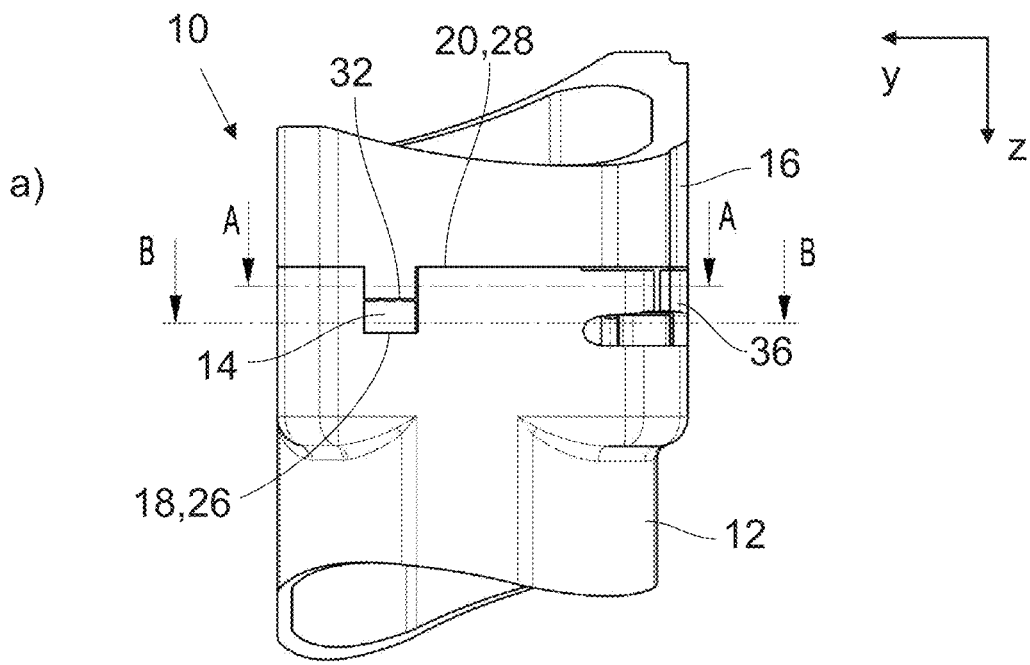
Fig.2A
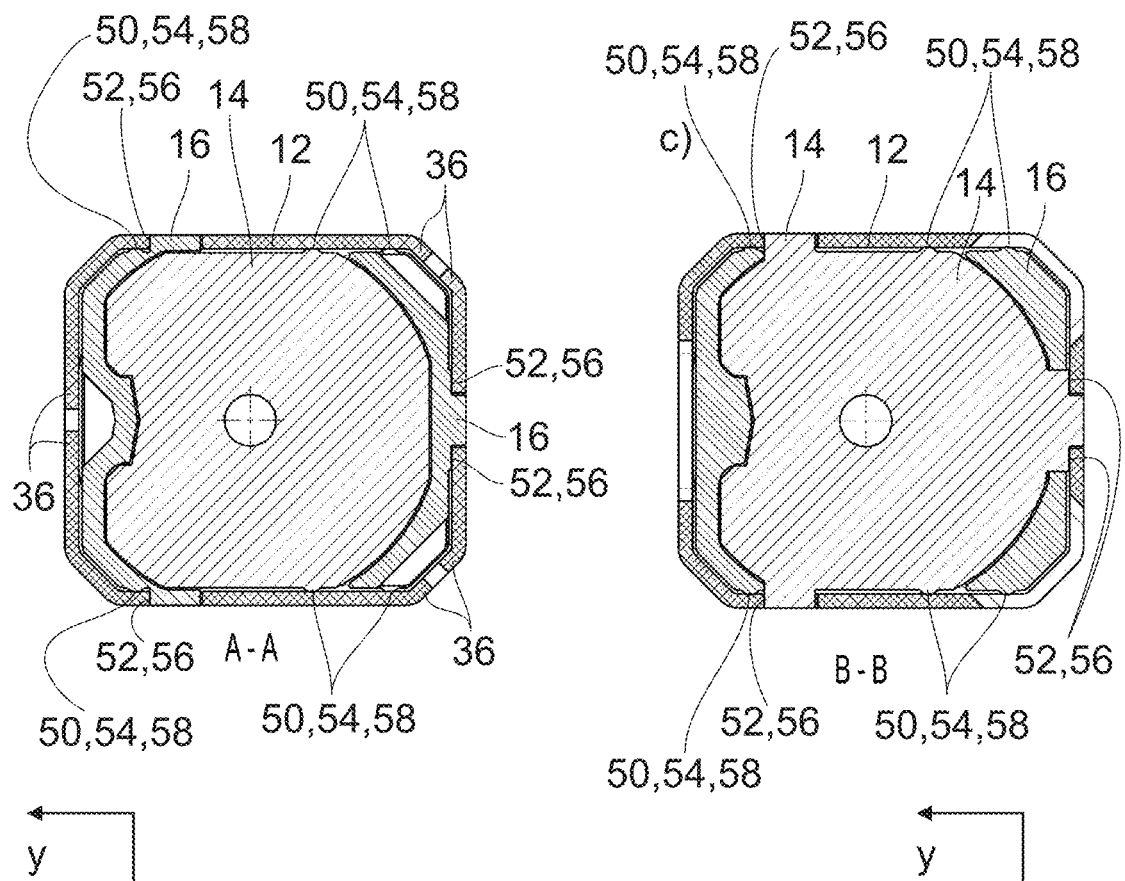
Fig.2B
Fig.2C

MOTOR TRANSMISSION CONNECTION ARRANGEMENT, IN PARTICULAR FOR USE IN VEHICLES

CROSS-REFERENCE TO RELATED APPLICATIONS

This application claims priority to European Patent Application No. 17 172 633.4, filed May 24, 2017, which is incorporated by reference in its entirety.

BACKGROUND

The present application relates to a motor transmission connection arrangement, in particular for use in vehicles.

SUMMARY

Motor transmission connection arrangements combine a drive motor, for example an electric motor, and a transmission into one construction unit. The construction unit resulting from the same can be pre-mounted by a manufacturer, whereby the installation in a device, in which the construction unit is to be inserted, can be simplified. Vehicles are a particular embodiment of this type of device, in which motor transmission connection arrangements are frequently used. In the wake of the increase in comfort in vehicles, ever more movements between vehicle components, which were previously carried out manually by the passengers, are carried out by motors, in particular by electric motors. Whereas in older vehicles, the windows and sunroofs were opened and closed through the use of levers, today, almost without exception, electric motor-driven window lifts are used. Electric tailgates, by means of which the tailgates can automatically be opened or closed by a button, are asserting themselves more and more. The number of assistance and safety systems is also increasing, in such a manner that the already limited installation space in the vehicle is even scarcer. Limited installation space will further increase with the advancing electrification of vehicles in as much as the batteries for the storage of electrical energy exhibit a comparatively limited energy density and therefore require quite a bit of space.

When using electric motors, the motor transmission connection arrangement comprises a motor pot for the accommodation of an electric motor, a brush holder for the holding of brushes of the electric motor, and a transmission housing for the accommodation of a transmission. During fitting, these three components must be oriented relative to one another and connected. Normally, the brush holder is centered within the motor pot and the transmission housing is connected with the motor pot by means of a flange-like connection. The connection of the transmission housing with the motor pot occurs by means of screws, which are implemented through openings, which are arranged on radially outwardly-protruding sections of the motor pot and of the transmission housing. A certain amount of installation space must be kept free due to these outwardly-protruding sections, space that is already scarce in vehicles for the previously named reasons.

In the event of a not sufficiently accurate orientation of the brush holder and of the transmission housing in relationship with the motor pot, an increased noise level occurs during operation of a drive unit, which is used by a motor transmission connection arrangement of this type. Motor transmission connection arrangements of this type are, for example, disclosed in US 2016/134073 A1, DE 101 38 749 A1 and DE 10 2014 212 135 A1.

The present application is directed to a motor transmission connection arrangement with which installation space is saved and which can be manufactured and installed easily. Moreover, the motor transmission connection arrangement should enable a possibly accurate orientation of the motor pot, the brush holder and of the transmission housing in relation to one another.

One embodiment of the present disclosure refers to a motor transmission connection arrangement, in particular for use in vehicles, comprising a motor pot for the accommodation of an electric motor, a brush holder for the holding of brushes of the electric motor, and a transmission housing for the accommodation of a transmission, whereby the motor pot, the brush holder and the transmission housing are pluggable to connect with one another. The motor pot exhibits a number of centering surfaces, whereby the motor pot respectively comes into contact with one of the centering surfaces as well as with the brush holder as well as with the transmission housing, when the motor pot, the brush holder and the transmission housing are plugged into one another, whereby the brush holder and the transmission housing are oriented in a concentric manner to the motor pot.

The number of centering surfaces can in principle be freely determined. Nonetheless, care should be given that in each of the three spatial axes, due to manufacturing tolerances, only one respective pair of contact surfaces and mating surfaces can be effective per spatial axis. A static redundancy is moreover to be avoided, which is the reason that a gap is purposely provided between two contact surface pairings, which could come into contact with one another. Changes in shape as a result of temperature variations can hereby be compensated, without tensions being induced in the concerned components.

The centering of the brush holders and of the transmission housing in reference to the motor pot is exclusively undertaken by means of the centering surfaces, which do not provoke any limitation of the movement along the longitudinal axis of the motor transmission connection arrangement, but rather limit the movement of the brush holders and of the transmission housing perpendicular to the longitudinal axis. In so doing, each of the foreseen centering surfaces, in itself, comes into contact both with the brush holder as well as the transmission housing. In this way, since the centering is only undertaken by means of respectively one of the centering surfaces, a summing up of the manufacturing tolerances is avoided. In the case of the state of the art motor transmission connection arrangement that was initially described, the brush holder and the transmission housing are each separately centered with respect to the motor pot, in such a manner that the tolerances are added up.

On the basis of the centering surfaces, according to the suggestion, it is possible that the brush holder and the transmission housing are easily very precisely arranged concentric to the motor pot. Generation of noise, provoked by an insufficiently concentric arrangement of the motor pot, of the brush holders and of the transmission housing to one another, is hereby avoided, in such a manner that the drive unit, which makes use of the motor transmission connection arrangement according to the suggestion, can be operated in a very silent manner.

In this embodiment, the motor pot serves as an accommodation in which the brush holder and the transmission housing are inserted. The centering surfaces run inside the motor pot, such that the brush holder and the transmission housing, in plugged-in state, more or less extend into the motor pot, whereby the brush holder in plugged-in state can also be completely surrounded by the motor pot. In this manner, the motor transmission connection arrangement can be shorter, whereby additional installation space can be saved in the axial direction. On the basis of the possibility of making the motor pot shorter, it is also not necessary for it to be as deeply-drawn, which represents a simplification from a manufacturing point of view.

The modifications which must be made to the brush holder when compared to known variants are significantly minor. The brush holder must solely be adapted so that the contact surfaces of the motor pot also actually produce a contact with the brush holder. The complexity for manufacturing the tool required in injection molding does not differ from the one used up to now. The difference lies exclusively in the contour of the cavity. The same also applies for the transmission housing. The basic construction of the brush holders and of the transmission housing need not be changed. The brush holder and the transmission housing can be manufactured using injection molding, in such a manner that large quantities can be manufactured at relatively limited cost.

A further embodiment is characterized in that the motor pot exhibits first contact surfaces, by means of which the motor pot comes into contact with the brush holder, and/or second contact surfaces, by means of which the motor pot comes into contact with the transmission housing, when the motor pot, the brush holder and the transmission housing are plugged into one another. The first and the second contact surfaces can thereby be designed so that in respect to the longitudinal axis of the motor transmission connection arrangement, they act as stop surfaces and limit the movement of the components with respect to one another along the longitudinal axis. The first and/or second contact surfaces do not have any concentric alignment effect on the brush holders and on the transmission housing in relation to the motor pot. It is possible to foresee the first and second mating surfaces in the transmission housing, with which the first and/or second contact surface(s) come(s) in contact, when the motor pot, the brush holder and the transmission housing are plugged into one another.

According to a further embodiment, the brush holder exhibits third contact surfaces, by means of which the brush holder comes into contact with the transmission housing, when the motor pot, the brush holder and the transmission housing are plugged into one another. It is thereby possible to supply the third contact surfaces with pinching ridges, which serve the purpose of compensation of any play of the motor transmission connection arrangement along the longitudinal axis. Beyond this, it is possible to foresee third mating surfaces in the transmission housing, with which the third contact surfaces come into contact when the motor pot, the brush holder and the transmission housing are plugged into one another.

In this embodiment, the transmission housing is contemporaneously used to limit the movement of the brush holder along the longitudinal axis of the motor transmission connection arrangement, in such a manner that no further measures need be taken for this. The design and the assembly are hereby made simpler.

With the centering surfaces according to the suggestion, the brush holder and the transmission housing are unequivocally centered in relation to the motor pot and arranged concentrically to the motor pot, so that no further measures, for example the use of positioning pins or the like, are still needed. Furthermore, in particular in the case in which the motor transmission connection arrangement exhibits third contact surfaces, it is no longer necessary to take special attachment measures for the attachment of the brush holders within the motor transmission connection arrangement. As a consequence, it is sufficient to connect the motor pot and the transmission housing, since the brush holder in reference to the longitudinal axis abuts on the one side the motor pot and on the other side the transmission housing.

In further formed embodiment, it is possible that the motor pot and/or the transmission housing can exhibit a crimped section for the connection of the transmission housing with the motor pot.

As was initially mentioned, in known motor transmission connection arrangements, this is achieved by means of screw connection using a flange-like connection. The motor transmission connection arrangement according to the suggestion enables the use of crimp sections which are deformed using an appropriate tool to connect the motor pot and the transmission housing. In so doing, the flange-like connection is not necessary, which is why the extension of the motor transmission connection arrangement in the radial direction is reduced and installation space can be saved.

In an alternative embodiment, the motor transmission connection arrangement exhibits centering surfaces, by means of which the transmission housing comes into contact both with the brush holder as well as the motor pot, when the motor pot, the brush holder and the transmission housing are plugged into one another, whereby the brush holder and the motor pot are oriented concentrically to the transmission housing. The advantages above also apply to this alternative embodiment.

An implementation of the present disclosure refers to a sunroof in a vehicle, comprising a motor transmission connection arrangement according to one of the previous embodiments. In addition, one implementation of the present disclosure refers to the use of a motor transmission connection arrangement according to one of the previous embodiments for auxiliary drives in vehicles, in particular in motor vehicles. When speaking of auxiliary drives, one is to understand drives with which a vehicle component is moved in relation to another vehicle component, for example in window lifts, tailgates and seats. Auxiliary drives are however not suitable to move the vehicle on its own.

One design of the present disclosure refers to a vehicle, in particular a motor vehicle, comprising a motor transmission connection arrangement according to one of the previous embodiments. The advantages and technical effects that can be achieved with a sunroof of this type, with the use of the motor transmission connection arrangement and a vehicle of this type, correspond to those that were described for the various embodiments of the motor transmission connection arrangement. As a result of the centering exclusively being undertaken by means of the centering surfaces, a summing up of the tolerances can be averted. Furthermore, a fastening of the transmission housing to the motor pot by means of crimping is possible, whereas in the state of the art, a screw connection is necessary. Logistics are hereby simplified, inasmuch as the crimping sections are directly formed on the motor pot and/or the transmission housing, and therefore no separate connection elements need to be made available. Very little installation space is in particular available for the drive of a sunroof when the sunroof is designed as a panoramic roof. In particular, in this case, the reduced installation space of the motor transmission connection arrangement according to the suggestion is shown to be most advantageous. Furthermore, on the basis of the possibility of arranging the brush holder and the transmission housing in an extremely precise concentric manner to the motor pot, it is possible to produce a very silent operation of the drive unit, which is used by the motor transmission connection arrangement according to the suggestion.

BRIEF DESCRIPTION OF THE DRAWINGS

The subject matter of the present application will be explained more closely below with reference to the accompanying drawings showing exemplary embodiments. The Figures show.

DETAILED DESCRIPTION

Figure 1A:
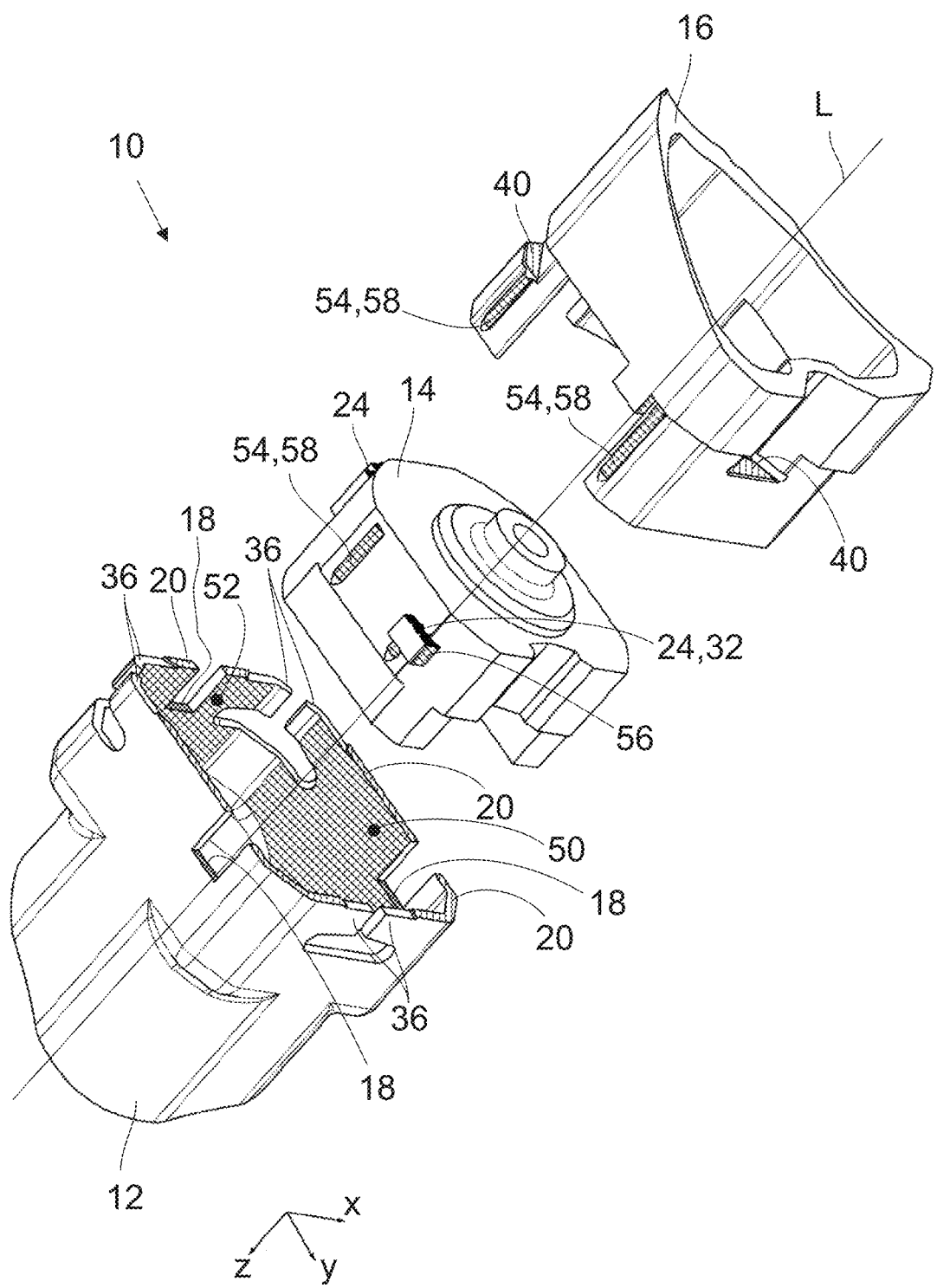
FIG. 1A a first exploded perspective view of an embodiment example of a motor transmission connection arrangement according to the suggestion, FIG. 1B a second exploded perspective view of the motor transmission connection arrangement shown in FIG. 1A, FIG. 1C a general sectional view through the motor transmission connection arrangement, FIG. 2A a side view of the motor transmission connection arrangement shown in FIG. 1A in assembled state, FIG. 2B a sectional representation along the A-A sectional plane defined in FIG. 2A, and FIG. 2C a sectional representation along the B-B sectional plane defined in FIG. 2A.

In the FIGS. 1A through 2C, an embodiment example of a motor transmission connection arrangement 10 according to the present disclosure is represented. The motor transmission connection arrangement 10 comprises a motor pot 12 for the accommodation of an electric motor that is not represented, a brush holder 14, with which brushes, which are not represented, for the electric motor are held, and a transmission housing 16 for the accommodation of a likewise not represented drive.

The motor pot 12 comprises first contact surfaces 18, by means of which the motor pot 12 comes into contact with the brush holder 14, when the brush holder 14 is plugged into the motor pot 12. Furthermore, the motor pot 12 exhibits second contact surfaces 20, by means of which the motor pot 12 comes into contact with the transmission housing 16, when the transmission housing 16 is plugged into the motor pot 12.

In addition, the brush holder 14 exhibits third contact surfaces 24, by means of which the brush holder 14 comes in contact with the transmission housing 16, when the brush holder 14 and the transmission housing 16 are plugged into the motor pot 12. Pinching ridges 32, about which further details will be given later, are arranged on the third contact surfaces 24.

Beyond this, the motor pot 12 comprises centering surfaces 50, which have an effect in the x-direction, and centering surfaces 52, which have an effect in the y-direction. The motor pot 12 comes into contact with each of the centering surfaces 50, 52, in its own right, both with the brush holder 14 as well as with the transmission housing 16, when the brush holder 14 and the transmission housing 16 are plugged into the motor pot 12. In other words, both the brush holder 14 as well as the transmission housing 16 abut respectively on one of the foreseen centering surfaces 50, 52.

The brush holder 14 and the transmission housing 16 exhibit first mating surfaces 26, second mating surfaces 28 and third mating surfaces 30, by means of which they come in contact with the first, second or third contact surface(s) 18, 20, 24, when the brush holder 14 and the transmission housing 16 are plugged into the motor pot 12.

In addition, the brush holder 14 and the transmission housing 16 exhibit centering mating surfaces 54, which in reference to the coordinate system indicated in the Figures, have an effect in the x-direction, and centering mating surfaces 56, that have an effect in the y-direction. As a consequence, the centering mating surfaces 54 extend parallel to a longitudinal axis L and lie in the y-z plane and upon contact with the centering surfaces 50 bring about a centering in the x-direction. Correspondingly, the centering surfaces 56 extend parallel to the longitudinal axis L and lie in the x-z plane. Upon contact with the centering surfaces 52 they bring about a centering in the y-direction with reference to the coordinate system.

In the embodiment example represented, the centering mating surfaces 54 are designed in the x-direction as elevations 58 or are arranged on elevations 58. The centering mating surfaces 54 come into contact with the centering surfaces 50 and the centering mating surfaces 56 come into contact with the centering surfaces 52, when the brush holder 14 and the transmission housing 16 are plugged into the motor pot 12.

Figure 1B:
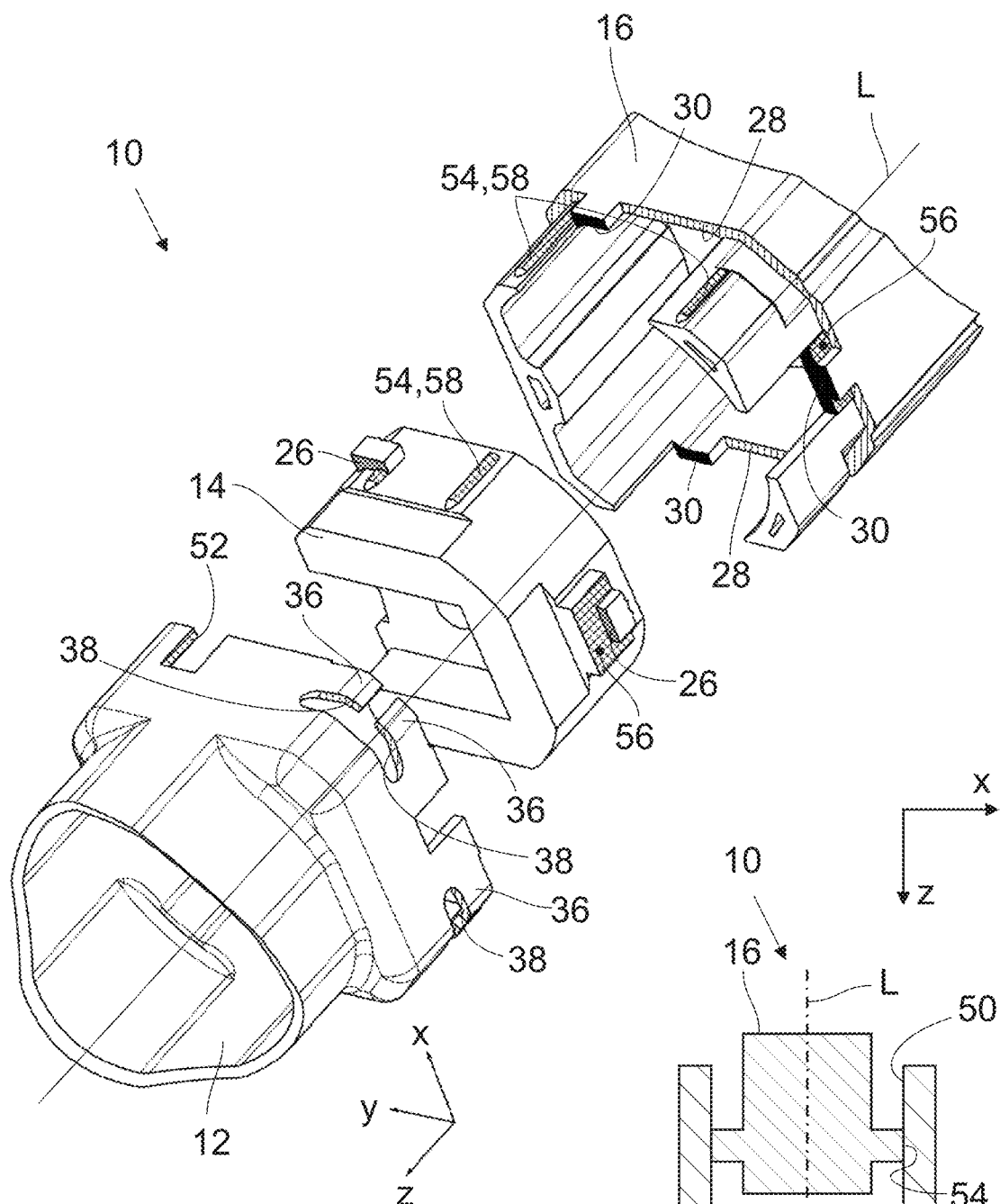

Upon observation of the FIGS. 1A and 1B, one can recognize that the first, second and third contact surfaces 18, 20, 24 lie in a plane that is perpendicular to the longitudinal axis L of the motor transmission connection arrangement 10. In reference to the coordinate system, they extend in an x-y plane, whereby the longitudinal axis L extends parallel to the z-axis of the coordinate system.

The first, second and third mating surfaces 26, 28, 30 also lie in the x-y plane that extends parallel to the longitudinal axis L. As a consequence, the first, second and third contact surfaces 18, 20, 24 have an effect as stops, which limit the movement of the motor pot 12, of the brush holders 14 and of the transmission housing 16 in relation to one another along the longitudinal axis L or alternatively the z-direction.

Beyond this, the motor pot 12 exhibits a total of six crimping sections 36, with which the transmission housing 16 can be fastened to the motor pot 12 and whereby the brush holder 14 is braced between the motor pot 12 and the transmission housing 16.

To fit the motor transmission connection arrangement 10, the brush holder 14 is initially inserted into the motor pot 12, until the first mating surfaces 26 of the brush holders 14 come into contact with the first contact surfaces 18 of the motor pot 12. In so doing, the centering mating surfaces 54 in the x-direction and the centering mating surfaces 56 in the y-direction of the brush holders 14 come in contact with the centering surfaces 50 in the x-direction and the centering surfaces 52 in the y-direction of the motor pot 12, whereby the brush holder 14 is oriented concentric to the motor pot 12 with regard to the longitudinal axis L.

Subsequently, the transmission housing 16 is inserted in the motor pot 12, up until the second mating surfaces 28 come into contact with the second contact surfaces 20 of the motor pot 12 and the third mating surfaces 30 with the third contact surfaces 24 of the brush holders 14. In so doing, the centering mating surfaces 54, 56 in the x- and in the y-direction of the transmission housing 16 come into contact with the centering surfaces 50, 52 in the x- and in the y-direction of the motor pot 12, in such a manner that also the transmission housing 16 in reference to the longitudinal axis L is concentrically oriented to the motor pot 12. As a consequence, the centering surfaces 50, 52 in the x- and in the y-direction and the centering mating surfaces 54, 56 in the x- and in the y-direction have a centering effect including in reference to the transmission housing 16.

In particular, it should be learned from FIG. 1A, that the motor pot 12 exhibits in total three first contact surfaces 18, which are arranged in a recess of the wall of the motor pot 12 that extends in the approximately rectangular cross section. Correspondingly, the brush holder 14 exhibits three first mating surfaces 26, which are arranged on projections of the brush holders 14, which can impinge in the recesses of the motor pot 12. The transmission housing 16 also exhibits three third mating surfaces 30, which can impinge in the recesses of the motor pot. The recesses are arranged in such a manner that the brush holder 14 and the transmission housing 16 can only be introduced in a turning position in the motor pot 12. In order to fasten the transmission housing 16 to the motor pot 12, the crimping sections 36 are bent radially inwards to the longitudinal axis L, in such a manner that a form-fit lock is created between the transmission housing 16 and the motor pot 12. The crimping sections 36 exhibit crimping surfaces 38 (see FIG. 1B) that lie approximately in the x-y plane and come in contact with the crimping mating surfaces 40 of the transmission housing 16 (see FIG. 1A). The crimping mating surfaces 40 extend approximately in the x-y plane; they are however somewhat tilted towards the x-y plane. Upon crimping or alternatively upon bending of the crimping sections 36, the crimping surfaces 38 cause friction against the crimping mating surfaces 40, in such a manner that a frictional lock is also at least partially provided.

Since the brush holder 14 abuts on one side by means of its first mating surfaces 26 with the first contact surfaces 18 of the motor pot 12 and on the other side by means of its third contact surfaces 24 with the third mating surfaces 30 of the transmission housing 16, its position within the motor transmission connection arrangement 10 is unequivocally determined, as soon as the crimping sections 36 have been bent. On the basis of the tilting of the crimping sections 40 towards the x-y plane, a final positioning of the transmission housing 16 and the brush holders 14 in reference to the longitudinal axis L takes place. The pinching ridges 32 are designed in such a manner that they are swaged upon the bending of the crimping sections 40, whereby the play of the motor transmission connection arrangement 10 is compensated along the longitudinal direction.

Figure 1C:
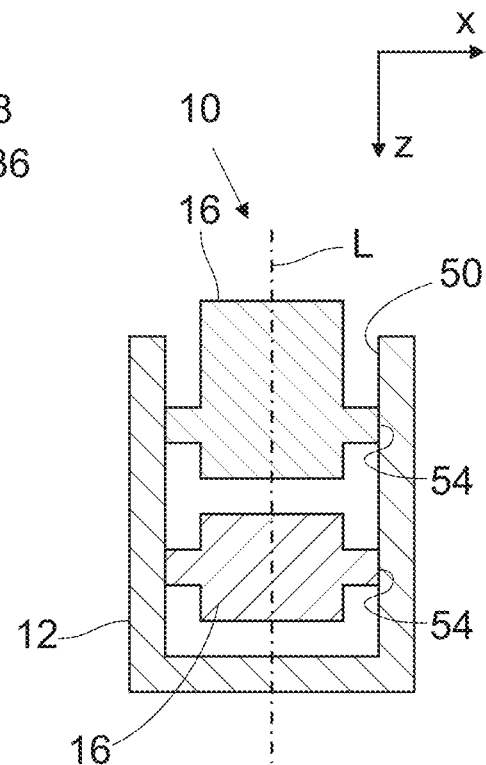

In FIG. 1C a general sectional representation through the motor transmission connection arrangement 10 is shown, when the motor pot 12, the brush holder 14 and the transmission housing 16 are plugged into one another. The FIG. 1C is intended to illustrate that, for example, in the sectional plane selected in FIG. 1C, the centering surface 50 of the motor pot 12 comes into contact both with the centering mating surface 54 of the brush holders 14 as well as with the centering mating surface 54 of the transmission housing 16. Further centering surfaces for centering in the x-direction are not foreseen. The centering in the x-direction takes place exclusively by means of the centering surface 50. The same holds true in a similar manner for the centering surface 52 in the y-direction. In so doing, it should be noted that for the case that is not illustrated, wherein the centering surface 50 exhibits a curvature around the longitudinal axis L and, for example, represents the interior surface of a hollow cylinder, the centering surface can also bring about a centering in this case in the y-direction.

The FIGS. 2A through 2C show the motor transmission connection arrangement 10 in assembled state, whereby the crimping sections 36 have not yet been bent.

REFERENCE SYMBOL LIST

10 Motor transmission connection arrangement
12 Motor pot
14 Brush holder
16 Transmission housing
18 First contact surfaces
20 Second contact surfaces
24 Third contact surfaces
26 First mating surfaces
28 Second mating surfaces
30 Third mating surfaces
32 Pinching ridges
36 Crimping section
38 Crimping surfaces
40 Crimping mating surfaces
50 Centering surfaces in x-direction
52 Centering surfaces in y-direction
54 Centering mating surfaces in x-direction
56 Centering mating surfaces in y-direction
58 Elevations
L Longitudinal axis

What is claimed:

1. A motor transmission connection arrangement, comprising:
    a motor pot for the accommodation of an electric motor, the motor pot including centering surfaces;
    a brush holder that holds brushes of the electric motor;
    a transmission housing that accommodates a transmission;
    wherein the motor pot, the brush holder and the transmission housing are pluggable to connect with one another;
    wherein the motor pot with respectively one of the centering surfaces comes into contact both with the brush holder as well as the transmission housing, when the motor pot, the brush holder and the transmission housing are plugged into one another; and
    wherein the centering surfaces abut against both the brush holder and the transmission housing to concentrically orientate the brush holder and the transmission housing relative to the motor pot;
    wherein concentrically orienting the brush holder relative to the motor pot is provided by only the centering surfaces abutting against the brush holder; and
    wherein concentrically orienting the transmission housing relative to the motor pot is provided by only the centering surfaces abutting against the transmission housing.

2. The motor transmission connection arrangement according to claim 1, wherein the motor pot further comprises first contact surfaces that contact the brush holder when the motor pot, the brush holder and the transmission housing are plugged into one another.

3. The motor transmission connection arrangement according to claim 1, wherein the motor pot further comprises second contact surfaces that contact the transmission housing when the motor pot, the brush holder and the transmission housing are plugged into one another.

4. The motor transmission connection arrangement according to one of the claim 1, wherein the brush holder includes third contact surfaces that contact the transmission housing, when the motor pot, the brush holder and the transmission housing are plugged into one another.

5. The motor transmission connection arrangement according claim 1, wherein the motor pot, the transmission housing, or both the motor pot and transmission housing, include crimping sections that connect the transmission housing with the motor pot.

6. The motor transmission connection arrangement according claim 1, wherein the electric motor operates a vehicle sunroof.

7. The motor transmission connection arrangement according claim 1, wherein the electric motor operates a vehicle auxiliary drive.

8. The motor transmission connection arrangement according to claim 1, wherein concentrically orienting the brush holder relative to the motor pot is independent of concentrically orientating the transmission housing relative to the motor pot.

9. The motor transmission connection arrangement according to claim 1, wherein concentrically orienting the brush holder relative to the motor pot is separate from concentrically orientating the transmission housing relative to the motor pot.

10. A motor transmission connection arrangement, comprising:
   a motor pot for the accommodation of an electric motor, the motor pot including centering surfaces;
   a brush holder that holds brushes of the electric motor;
   a transmission housing that accommodates a transmission;
   wherein the motor pot, the brush holder and the transmission housing are pluggable to connect with one another;
   wherein the motor pot with respectively one of the centering surfaces comes into contact both with the brush holder as well as the transmission housing, when the motor pot, the brush holder and the transmission housing are plugged into one another, wherein the brush holder and the transmission housing are concentrically oriented to the motor pot;
   wherein the motor pot further comprises:
      first contact surfaces that contact the brush holder when the motor pot, the brush holder and the transmission housing are plugged into one another;
      second contact surfaces that contact the transmission housing when the motor pot, the brush holder and the transmission housing are plugged into one another; and
   wherein the brush holder includes third contact surfaces that contact the transmission housing, when the motor pot, the brush holder and the transmission housing are plugged into one another;
   wherein the centering surfaces abut against both the brush holder and the transmission housing to concentrically orientate the brush holder and the transmission housing relative to the motor pot;
   wherein concentrically orienting the brush holder relative to the motor pot is provided by only the centering surfaces abutting against the brush holder; and
   wherein concentrically orienting the transmission housing relative to the motor pot is provided by only the centering surfaces abutting against the transmission housing.

11. The motor transmission connection arrangement according claim 10, wherein the electric motor operates a vehicle auxiliary drive.

12. The motor transmission connection arrangement according claim 11, wherein the vehicle auxiliary drive is a vehicle sunroof drive.

13. A motor transmission connection arrangement, comprising:
   a motor pot for the accommodation of an electric motor;
   a brush holder that holds brushes of the electric motor;
   a transmission housing that accommodates a transmission;
   wherein the motor pot, the brush holder and the transmission housing are pluggable to connect with one another;
   wherein when the motor pot, the brush holder and the transmission housing are plugged into one another, the motor pot comes into contact both with the brush holder and the transmission housing;
   wherein the brush holder and the transmission housing are concentrically oriented to the motor pot;
      wherein the motor pot further comprises:
         first contact surfaces that contact the brush holder when the motor pot, the brush holder and the transmission housing are plugged into one another; and
         second contact surfaces that contact the transmission housing when the motor pot, the brush holder and the transmission housing are plugged into one another;
   wherein the centering surfaces abut against both the brush holder and the transmission housing to concentrically orientate the brush holder and the transmission housing relative to the motor pot;
   wherein concentrically orienting the brush holder relative to the motor pot is provided by only the centering surfaces abutting against the brush holder; and
   wherein concentrically orienting the transmission housing relative to the motor pot is provided by only the centering surfaces abutting against the transmission housing.

14. The motor transmission connection arrangement according claim 13, wherein the brush holder includes third contact surfaces that contact the transmission housing, when the motor pot, the brush holder and the transmission housing are plugged into one another.

15. The motor transmission connection arrangement according claim 13, wherein the electric motor operates a vehicle sunroof.

\* \* \* \* \*